(12) United States Patent
Gonzales et al.

(10) Patent No.: US 7,651,267 B2
(45) Date of Patent: Jan. 26, 2010

(54) SENSOR ARRANGEMENT AND METHOD FOR USING SAME

(75) Inventors: Phillip Gonzales, Dearborn, MI (US); Ronald Elder, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 11/463,057

(22) Filed: Aug. 8, 2006

(65) Prior Publication Data

US 2008/0036590 A1    Feb. 14, 2008

(51) Int. Cl.
  *G01K 7/00* (2006.01)
  *G01B 1/00* (2006.01)
  *G01R 3/00* (2006.01)

(52) U.S. Cl. .............. 374/176; 374/163; 374/183; 374/187; 340/539.27; 340/584; 324/260

(58) Field of Classification Search ............ 374/141, 374/176, 163, 183, 187; 340/584, 539.27; 324/260
See application file for complete search history.

(56) References Cited

U.S. PATENT DOCUMENTS

| | | | |
|---|---|---|---|
| 3,158,027 A | | 11/1964 | Kibler |
| 3,260,116 A | * | 7/1966 | Grady, Jr. .................. 374/183 |
| 3,541,450 A | | 11/1970 | Harrison |
| 3,872,455 A | * | 3/1975 | Fuller et al. ............ 340/870.05 |
| 4,399,441 A | | 8/1983 | Vaughan et al. |
| 4,617,441 A | * | 10/1986 | Koide et al. ................. 219/627 |
| 4,684,869 A | * | 8/1987 | Kobayashi et al. .......... 320/108 |
| 4,719,432 A | * | 1/1988 | Heck et al. ................... 331/66 |
| 5,495,230 A | | 2/1996 | Lian |
| 5,592,095 A | | 1/1997 | Meadows |
| 5,601,367 A | * | 2/1997 | Nara .......................... 374/183 |
| 5,963,173 A | | 10/1999 | Lian et al. |
| 6,348,865 B1 | | 2/2002 | Siegel |
| 6,534,767 B1 | * | 3/2003 | Di Maio et al. ........... 250/338.2 |
| 6,642,016 B1 | * | 11/2003 | Sjoholm et al. ............... 435/15 |
| 6,720,866 B1 | | 4/2004 | Sorrels et al. |
| 6,806,808 B1 | * | 10/2004 | Watters et al. ........... 340/10.41 |
| 6,864,108 B1 | * | 3/2005 | Rao et al. ..................... 438/14 |
| 6,929,396 B2 | * | 8/2005 | Gramsamer et al. ......... 374/152 |
| 7,044,633 B2 | * | 5/2006 | Clabes et al. ................... 374/1 |
| 2002/0150140 A1 | * | 10/2002 | Julicher et al. ............. 374/120 |
| 2003/0235233 A1 | * | 12/2003 | Kawakatsu ................. 374/118 |
| 2004/0046643 A1 | | 3/2004 | Becker et al. |
| 2005/0054292 A1 | | 3/2005 | Janusz et al. |
| 2005/0070811 A1 | * | 3/2005 | Crowley ..................... 600/549 |
| 2005/0286607 A1 | * | 12/2005 | Kim et al. ................... 374/120 |
| 2006/0023768 A1 | * | 2/2006 | Ishihara et al. ............. 374/142 |
| 2007/0263699 A1 | * | 11/2007 | Clothier et al. ............. 374/163 |

* cited by examiner

*Primary Examiner*—Gail Verbitsky
*Assistant Examiner*—Mirellys Jagan
(74) *Attorney, Agent, or Firm*—David B. Kelley; Brooks Kushman P.C.

(57) ABSTRACT

A sensor arrangement includes, in some embodiments, a magnetostrictive element configured to output magnetic signals in response to a magnetic field. A sensor is configured to sense a value of a property of a selected object, and to provide an electrical resistance that varies in response to variations in the sensed value. The sensor cooperates with the magnetostrictive element to vary the frequency of the signals output by the magnetostrictive element based on variations of the electrical resistance provided by the sensor. A transmitter provides an alternating magnetic field to the magnetostrictive element, and a receiver picks up the magnetic signals generated by the magnetostrictive element. The frequency of the signals received is correlated with the sensor resistance, and the resistance is correlated to a value of the property sensed.

18 Claims, 2 Drawing Sheets

SENSOR ARRANGEMENT AND METHOD FOR USING SAME

BACKGROUND OF THE INVENTION

1. Field of the Invention

The present invention relates to a sensor arrangement and a method for using a sensor arrangement to determine a value of at least one property of a selected object.

2. Background Art

Determining the value of a property of a device—e.g., the temperature of a heat producing device—can require one or more sensors connected to a receiving unit, such as a control module, often with a complex wiring distribution system. In addition to carrying the signal from the sensors, wires may be required for transmission of power to active electronic elements in a sensor circuit to facilitate their operation.

When it is desired to measure more than one property, the number of sensors, and the complexity of the information distribution system may increase significantly. For example, high voltage battery systems in hybrid electric vehicles and fuel cell vehicles require voltage and temperature sensing to determine the operating state of the battery systems to properly control the powertrain and other systems of the vehicle. Conventional systems relay the voltage and temperature information to one or more control modules in the vehicle. The information is transferred via a wiring distribution system that uses an undesirable amount of package space, requires special shielding from heat and electromagnetic interference, requires special assembly processes, and has life and reliability concerns. Sensing systems that do not require wires to transfer information—e.g., infrared system—require a line of sight between the sensors and the unit receiving the sensed information. Such line-of-sight systems are not practical for most vehicle applications.

Therefore, a need exists for a sensor arrangement that can provide information about the properties of devices and systems without using a complex wiring system to transfer the information between the sensors and a receiving unit. In addition, there is a need for a sensor arrangement that does not include active electronic components that require a source of power for their operation.

SUMMARY OF THE INVENTION

Accordingly, the present invention provides a sensor arrangement that is adaptable for use with one or more sensors configured to transmit information wirelessly to a receiving unit without requiring a line of sight between the sensors and the receiving unit.

The invention also provides a sensor arrangement that can be used to determine the values of different properties, such as temperature and voltage, of one or more selected objects. The sensor arrangement uses passive devices that do not require a power source for their operation.

In addition to including one or more sensors in the sensor arrangement of the present invention, embodiments may include identification circuits so that the sensors and the respective objects they are working on can be easily identified. The identification circuit can be integrated into the sensor arrangement, such that identification information is also transmitted wirelessly, without the need for an external power source, such as a battery.

The invention further provides a sensor arrangement for determining a value of at least one property of a selected object. The sensor arrangement includes a magnetostrictive element configured to output magnetic signals in response to an alternating magnetic field. The sensor arrangement also includes a first sensor configured to sense a value of a property of the selected object, and to provide an electrical resistance that varies in response to variations in the sensed value. The first sensor cooperates with the magnetostrictive element to vary the frequency of the signals output by the magnetostrictive element based on variations of the electrical resistance provided by the first sensor.

The invention also provides a sensor arrangement that includes a passive transducer configured to output mechanical oscillations at a frequency in response to a magnetic field. The mechanical oscillations generate corresponding magnetic output signals that can be received by a control module remotely located from the transducer. A first sensor, such as described above, cooperates with the transducer, such that the frequency of the output signals generated by the transducer is at least in part dictated by the electrical resistance provided by the first sensor.

The invention further provides a method for determining a value of at least one property of at least one selected object using a sensor arrangement that includes a passive transducer and a first sensor, such as described above. The method includes sensing a value of a first property of the selected object, sending a magnetic field to the transducer, receiving the output signals generated by the transducer, and determining the sensed value of the first property using the output signals received. This determination includes correlating the frequency of the output signals received with the resistance of the first sensor, and correlating the resistance of the first sensor with the sensed value.

In particular embodiments of the present invention, the sensor arrangement can include an acousto-magnetic system and a sensor providing a variable resistance, such as a thermistor. Acousto-magnetic systems are well known in the art, and are frequently used in electronic article surveillance (EAS) systems. One such device is described in U.S. Pat. No. 5,495,230 issued to Lian on Feb. 27, 1996, which is hereby incorporated herein by reference.

Embodiments of the present invention using an acousto-magnetic system may use a magnetostrictive element such as those found in EAS systems. The magnetostrictive element is made from one or more ferromagnetic metals, such as iron or nickel. The element can be fashioned in the shape of a very thin coil of the type frequently found in the anti-theft devices on consumer articles. In the presence of a magnetic field, the magnetostrictive element deforms, and where the magnetic field is alternating, the magnetostrictive element produces mechanical oscillations. Because the element is magnetic, these oscillations also produce a magnetic output signal that can be picked up by a receiver, which can be configured to determine the frequency of the output signals generated by the element.

In embodiments of the present invention, a sensor, such as a thermistor, is connected to the magnetostrictive element such that the thermistor provides a resistance to the oscillations of the element. The resistance provided by the thermistor changes with the temperature of the object to which the thermistor is attached. Thus, the thermistor provides a resistance to the magnetostrictive element that varies with variations in the temperature of the object being examined.

The frequency of the signal output by the magnetostrictive element is dependent on the resistance provided by the thermistor. Thus, as the temperature of the object changes, the resistance provided by the thermistor changes, and the frequency of the signals output by the magnetostrictive element changes. In this way, the frequency of the output signal generated by the magnetostrictive element is indicative of the temperature of the object. When the receiver picks up the output signal from the magnetostrictive element, it can itself process the information, or send it to some other control unit to process and interpret the signal. This provides a robust system for measuring the temperature of an object remotely, without the use of wires, and without requiring a line of sight between the sensor and the receiver. In addition, a thermistor and the magnetostrictive element can be provided in a very small package, thereby providing a sensor arrangement that is lightweight, and has the ability to be positioned directly on a particular object. This is in contrast to measuring a proximity temperature that provides only an estimate of the temperature of the actual object.

In addition to a thermistor, or instead of a thermistor, other sensors can be combined with a passive transducer, such as a magnetostrictive element in accordance with embodiments of the present invention. For example, an integrated circuit can be configured to measure voltage, such that a variation in the voltage being measured causes a variation in the resistance of the voltage circuit. Such a circuit can be combined with a magnetostrictive element in a similar fashion to the thermistor example described above. In an application such as a high voltage battery in a hybrid or a fuel cell vehicle, many such sensing elements can be used to provide information about the temperature and/or voltage of different battery modules within the battery pack. For example, a high voltage battery system may include 200-300 battery cells, which can be conveniently linked in battery modules containing 4-16 cells. By using a sensor arrangement in accordance with the present invention, thermistor circuits and voltage circuits can be combined with passive transducers and placed on some predetermined number of the battery cells or battery modules. In such an application, it may be convenient to know the location of each of these sensor arrangements. Therefore, the present invention also provides a mechanism for identifying the particular sensor unit—i.e., the sensor/transducer combination—that is providing the output signals.

In some embodiments of the present invention, an identification circuit, for example in the form of a semiconductor, is attached to a magnetostrictive element in a fashion similar to the sensors described above. Unlike the thermistor, or other sensor that provides a resistance that varies in accordance with the value of the property being measured, the identification circuit can be provided with a single resistance, and each identification circuit used in a particular application can be provided with a different, generally constant resistance. In addition, a sensor arrangement in accordance with the present invention can include control circuitry, for example, integrated into the identification circuit, that allows the sensors to be enabled and disabled as desired. In this way, the identification circuit can disable all of the sensors it is associated with, so that the only resistance that influences the output signal of the magnetostrictive element is the resistance of the identification circuit itself. This results in a different frequency for the output signals received from each of the different sensor units. This allows each of the sensor units to be identified. When the sensor units are used, for example, in a high voltage battery system for a hybrid vehicle, identification of the sensor units allows for identification of the battery modules.

In one embodiment of the present invention, the sensor arrangement includes a number of sensor units, each of which has a magnetostrictive element, an identification circuit, a thermistor, and a voltage sensor. The identification circuit provides a generally constant reference resistance to the magnetostrictive element, and also includes control circuitry to selectively enable and disable the thermistor and the voltage sensor. An antenna is connected to a battery control module (BCM) to output the magnetic field to each of the sensor units. The BCM can be configured to generate the magnetic field, and specifically, provide the input to the sensor units in the form of a pulsed magnetic field. This allows the magnetostrictive elements to be excited while the pulse is on, and to provide an output signal back to the antenna when the pulse is off. In addition to providing the magnetic field to the magnetostrictive elements, the antenna also receives the output signals from each of the elements, such that the BCM acts as both a transmitter and a receiver.

The control circuitry integrated into the identification circuit is configured such that when the vehicle is first started—i.e., when the vehicle is in a key-on state—each of the sensors associated with a particular identification circuit will be disabled. The BCM then provides a magnetic field to each of the sensor units on the battery modules. The frequency of the output signals from each of the magnetostrictive elements will now be affected by the identification circuit, but not by any of the thermistors or voltage sensors. When the output signals from the magnetostrictive elements are received by the BCM, each of the sensor units, and hence the battery modules, can be identified.

The control circuitry integrated into the identification circuits is also configured such that after the vehicle leaves the key-on state, and is in an operating state, the thermistors and the voltage sensors will be alternately enabled and disabled, such that only one of these devices in each sensor unit is enabled at one time. For example, when the BCM outputs a magnetic field to the sensor units the first time the vehicle leaves the key-on state, each of the thermistors may be disabled by the control circuitry in a respective identification circuit, so that the voltage of each of the battery modules can be determined. The next time the BCM outputs the magnetic field to the sensor units, the control circuitry can disable each of the voltage sensors, and enable each of the thermistors, such that the temperature of each of the battery modules can be determined. The alternating of the enabling and disabling of the sensors can be controlled, for example, through the use of a clock circuit in the control circuitry. In this way, each of the thermistors remains enabled for a predetermined time, and then is disabled. Similarly, each of the voltage sensors remains enabled for a certain period of time, and then is disabled.

In addition to the information sensed directly by each of the sensors, the information provided by the sensor arrangement of the present invention can be combined with other information about vehicle systems to provide even more useful data for controlling the vehicle and its systems. For example, as the voltage of each of the battery modules is determined, the receipt of the information can be time stamped so that it can be correlated with battery current measurements that are also time stamped. In this way, a determined voltage and a determined current of the battery, each measured at the same time, can be used to determine the state of charge (SOC) of the battery module at that time. This information is very useful, in that many of the controls of hybrid electric vehicles are based on battery SOC. Moreover, because the SOC can be determined for individual battery modules, and because each of these battery modules can be identified, it is possible to provide targeted maintenance to the battery so that only certain battery modules are repaired or replaced, instead of replacing the entire battery system. The information received by the BCM can be communicated to other onboard controllers, such as a vehicle system controller (VSC) and/or a powertrain control module (PCM). In addition, output from the BCM can be connected to operator indicators, such as those found in an operator information display in an instrument panel.

DETAILED DESCRIPTION OF THE PREFERRED EMBODIMENT(S)

Figure 1:
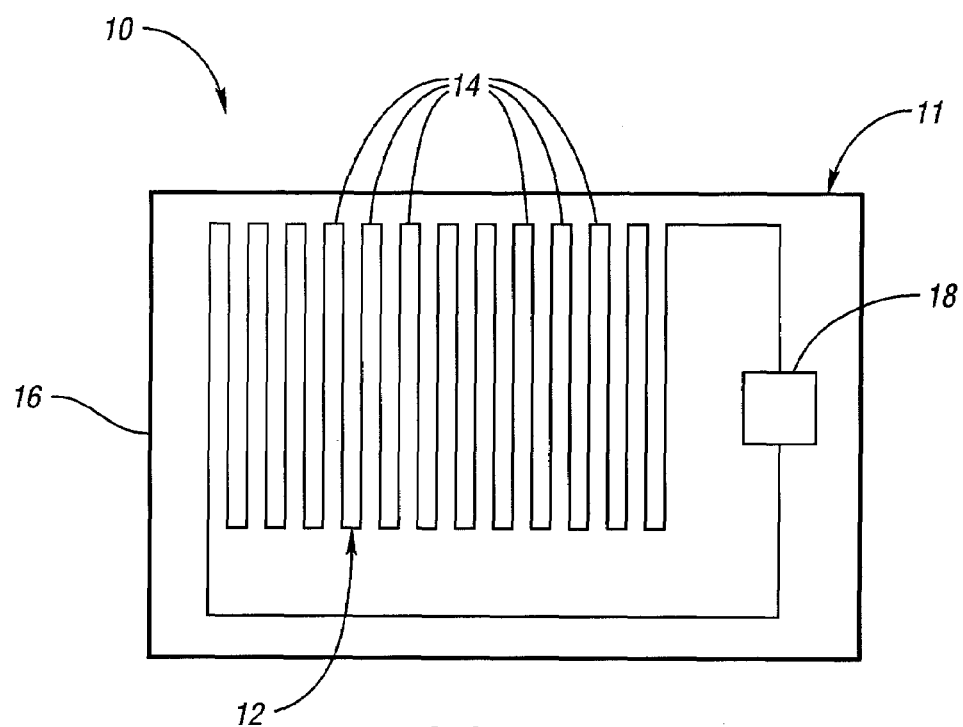
FIG. 1 shows a sensor arrangement including a passive transducer and a thermistor in accordance with one embodiment of the present invention.

FIG. 1 shows a sensor arrangement 10 in accordance with an embodiment of the present invention. The sensor arrangement 10 includes a sensor unit 11 configured with a passive transducer, in this embodiment, a magnetostrictive element 12. The magnetostrictive element 12 can be made, for example, from iron, nickel, or some other alloy that exhibits the desired properties of mechanically deforming in the presence of a magnetic field, and outputting magnetic signals. As shown in FIG. 1, the magnetostrictive element 12 is configured as a series of loops 14 adjacent to one another. The actual size of the sensor unit 11 is greatly exaggerated in FIG. 1, and in practice, may have a small surface area, and a very thin profile. For example, in some embodiments, a sensor unit, such as the unit 11, may be approximately: 30 millimeters (mm) long, 12 mm wide, and 4 mm thick.

Different magnetostrictive elements have different resonant frequencies that may be affected by the size and shape of the element. Therefore, the packaging considerations of the particular application, as well as the desired frequency of the magnetostrictive element, may need to be taken into account when determining the size of the sensor arrangement. As shown in FIG. 1, the magnetostrictive element 12 is disposed on a thin tape material 16, which may have a self-adhesive backing. This facilitates easy application of the sensor unit 11 to a particular selected object.

As shown in FIG. 1, the sensor unit 11 also includes a thermistor 18 operatively connected to the magnetostrictive element 12. The thermistor 18 can be connected to the element 12 via any method effective to connect the two devices, such that the thermistor 18 provides a resistance to the magnetostrictive element 12. For example, surface mount technology (SMT) can be used to easily attach the thermistor 18 to the element 12. Such SMT mounting techniques can include, for example, an electrically conductive adhesive, or a metallic solder material. The thermistor 18 provides a resistance to the magnetostrictive element 12 that varies with the temperature being sensed by the thermistor 18. In this way, the frequency of signals output by the magnetostrictive element 12 will vary with the sensed temperature.

Figure 2:
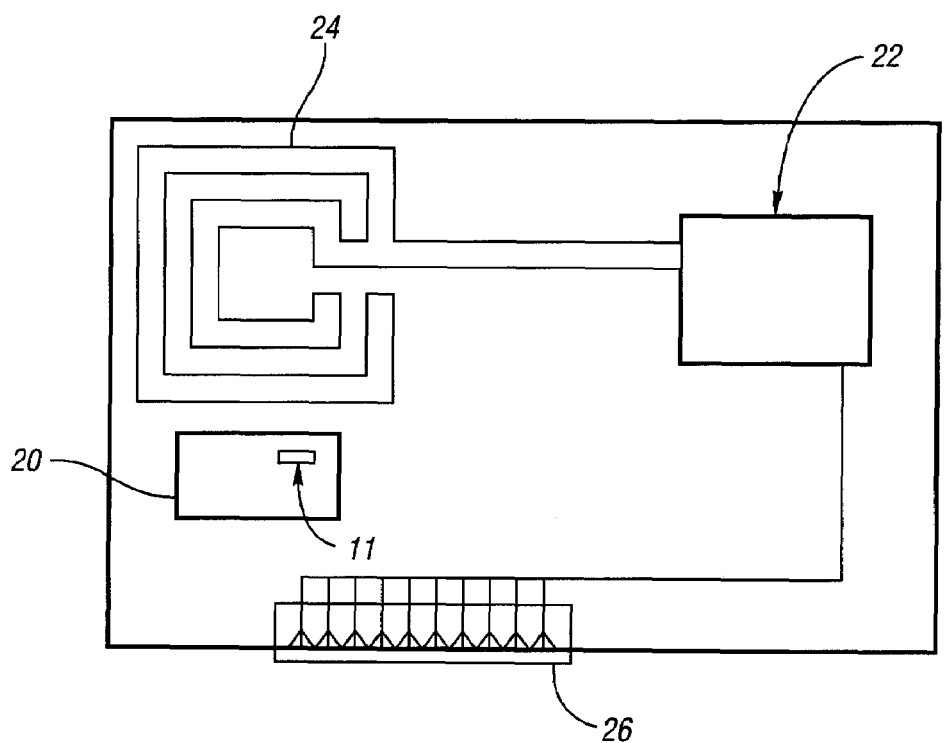
FIG. 2 shows the sensor arrangement of FIG. 1 with the addition of an antenna for sending and receiving signals, which is connected to a control module having an output to a vehicle system interface.

FIG. 2 shows the sensor unit 11 attached to a selected object 20, which can be any device for which a temperature reading is desired. To provide a magnetic field to the sensor unit 11, a control module 22, including an antenna 24 is provided. The antenna 24 is in proximity to the object 20, and in particular, in proximity to the sensor unit 11. The particular shape and size of an antenna, such as the antenna 24, may be dictated by the distance between the antenna and the sensor unit or units with which it communicates. The control module 22 acts both as a transmitter and receiver of magnetic waves. In particular, the control module 22 is configured to send a pulse width modulated (PWM) signal to the sensor unit 11 to excite the magnetostrictive element 12—this can be referred to as "ringing" the sensor unit 11. The magnetostrictive element 12 oscillates in the presence of the alternating magnetic field provided by the PWM signal.

Shortly after the PWM signal is stopped, the magnetostrictive element 12 continues to vibrate, thereby outputting magnetic signals back to the control module 22 at some frequency—i.e., the magnetostrictive element 12 "rings back". The control module 22 is configured to determine the frequency of the signal it receives, and correlate that frequency with the resistance provided by the thermistor 18. The resistance provided by the thermistor 18 can then be correlated to the temperature being sensed, and thus, the temperature of the object 20 at the location of the sensor unit 11 is determined. The control module 22 is connected to an output interface 26 so that the information picked up from the sensor unit 11 can be used by other controllers and other systems, for example, throughout a vehicle.

Figure 3:
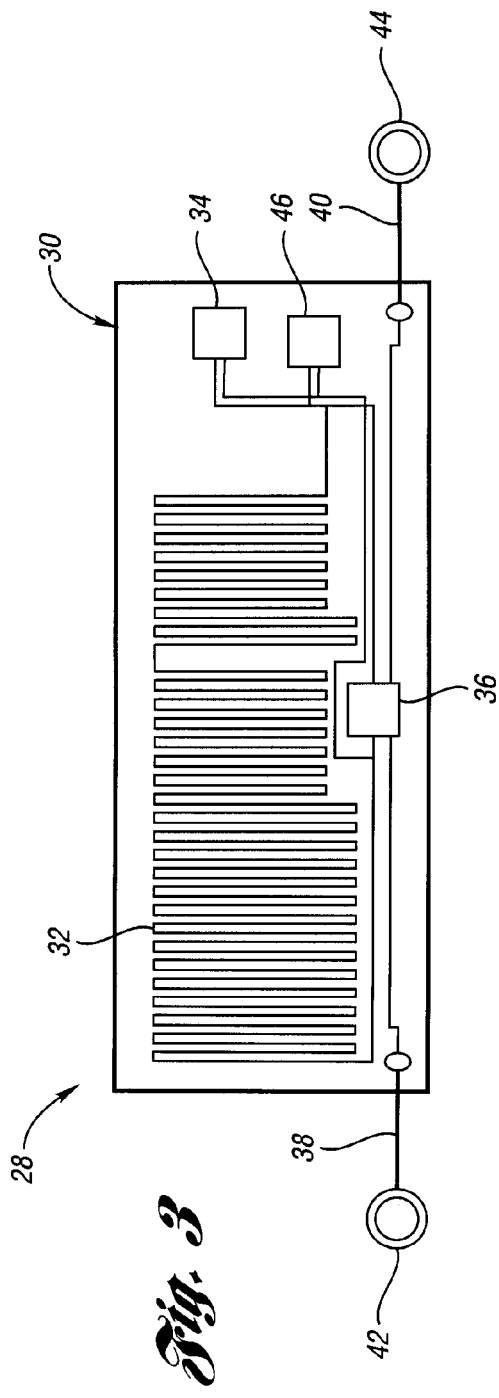
FIG. 3 shows a sensor arrangement in accordance with another embodiment of the present invention, including a passive transducer, an identification circuit, a thermistor, and a voltage sensor.

FIG. 3 shows a sensor arrangement 28 in accordance with another embodiment of the present invention. The sensor arrangement 28 includes a sensor unit 30 having a passive transducer, or magnetostrictive element 32, and a number of resistive elements attached thereto. In particular, the resistive elements include a first sensor, or thermistor 34, and a second sensor, or voltage sensor 36. Each of the sensors 34, 36 are operatively connected to the magnetostrictive element 32, for example, using SMT mounting techniques. The voltage sensor 36 can be any circuit or device effective to measure the potential across two terminals, and to provide a resistance in response to a measured voltage. For example, the voltage sensor 36 may be a voltage divider circuit well know to those in the art.

In addition to being connected to the magnetostrictive element 32, the voltage sensor 36 is also connected to two leads 38, 40 which respectively terminate at contacts 42, 44. The contacts 42, 44 can be directly attached to the positive and negative terminals on a battery cell, a battery module, or an entire battery pack. Similar to the function of the thermistor 34, the voltage sensor 36 provides a resistance to the magnetostrictive element 32 that varies with variations in the value of a particular sensed property—i.e., the voltage of the selected battery. In this way, the signals output by the magnetostrictive element 32 will have different frequencies, depending on the voltage sensed by the sensor 36.

In addition to the sensors 34, 36, the sensor unit 30 also includes an identification circuit 46. The identification circuit 46 provides a generally constant resistance to the magnetostrictive element 32, thereby providing the sensor arrangement 28 with a number of advantageous features. For example, because the resistance of the identification circuit 46 is generally constant and is known, its influence on the frequency of the signals output by the magnetostrictive element 32 can be easily accounted for if one or both of the sensor 34, 36 are enabled. In addition, where a sensor arrangement, such as the sensor arrangement 28, includes more than one sensor unit, such as the sensor unit 30, each identification circuit on a respective sensor unit can be configured with a different resistance. In this way, signals received from multiple sensor units can be identified, thereby identifying the object to which the sensor unit is attached.

In addition, to providing an easy and effective means for identifying the sensor unit, the identification circuit 46 is also configured with control circuitry that can selectively enable and disable the sensors 34, 36. As described above, this provides a mechanism for easily identifying a particular property—e.g., a temperature or a voltage—of an object such as a battery.

Figure 4:
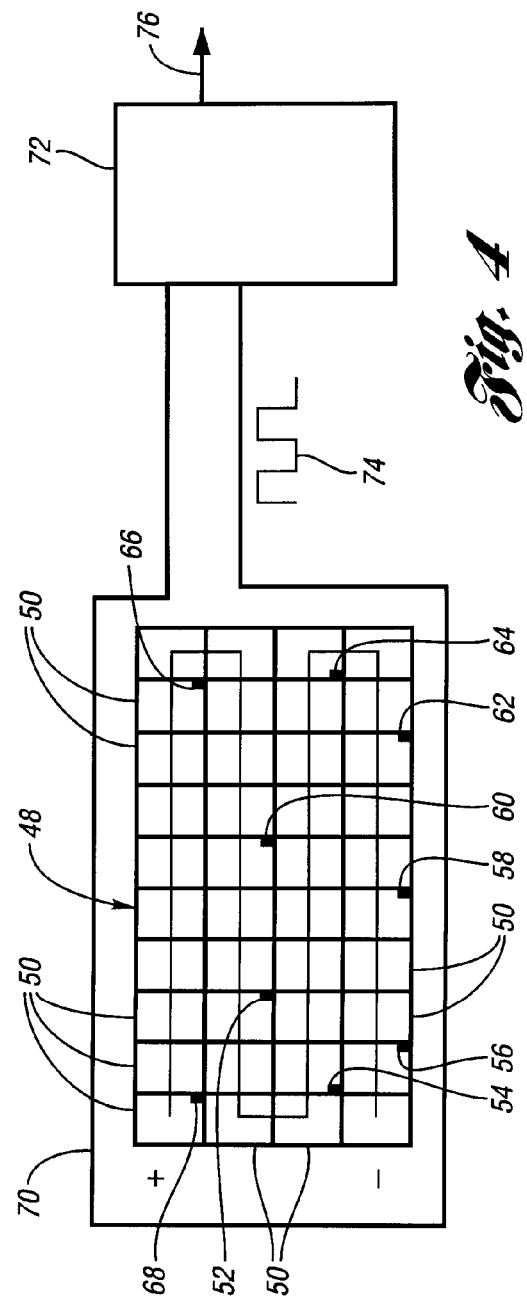
FIG. 4 shows a plurality of the sensor arrangements shown in FIG. 3 used in a battery system in a vehicle.

FIG. 4 shows a schematic diagram of a high voltage battery system 48 made up of a number of battery modules 50. Throughout the battery system 48, are a number of sensor units 52, 54, 56, 58, 60, 62, 64, 66, 68 attached to various battery modules 50. Each of the sensor units 52-68 is configured similarly to the sensor unit 30, shown in FIG. 3. One difference is that each of the sensor units 52-68 has a different identification circuit to allow it to be identified. It is understood that sensor units, such as the sensor units 52-68, can be attached to individual battery cells, battery modules, or even to the output from the entire battery system 48.

Surrounding the battery system 48, and therefore each of the sensor units 52-68, is an antenna 70, which is attached to a BCM 72. Just like the control module 22 described in FIG. 2, the BCM 72 is configured to act as both a transmitter and a receiver for signals to and from the sensor units 52-68. In other embodiments, different types of controllers can be used. For example, if the object under consideration is a motor, the transmitter, receiver, or both, can be integrated into a motor controller that is configured to control operation of the motor.

The BCM 72 is specifically configured to output a PWM signal, illustrated as a square wave signal 74 in FIG. 4. The frequency of the wave signal 74 may be dictated by the particular magnetostrictive elements being used in the sensor units 52-68. A frequency of 58 kilohertz (kHz) has been found to be effective for some magnetostrictive elements. After the BCM 72 receives the output signals back from the sensor units 52-68, it can output this information via an output interface 76, which can be connected to one or more vehicle system controllers. Moreover, the BCM 72 can receive information from various vehicle system controllers that can be used as part of the strategy for gathering information from the various sensor units 52-68.

By way of example, a VSC may provide information to the BCM indicating that the vehicle is in a key-on state, or that it is in a normal operation state. This information can be used to determine whether the control circuitry in the identification circuits of the sensor units 52-68 should enable or disable one or more of their associated sensors, such as the sensors 34, 36. As described above, this provides an easy and effective mechanism for independently determining the sensed values of the battery properties, such as the voltage and temperature.

Although the antenna 70, in the embodiment shown in FIG. 4, is disposed around the perimeter of the battery system 48, other configurations may be used. Some factors that may dictate a particular antenna configuration include the number and location of the sensor units being used throughout the battery system, the size of the battery system, and the ease with which magnetic signals can be sent and received—e.g., whether the battery system is enclosed in a metal case. Regardless of the particular antenna configuration, it is clear from the description and illustrations of the embodiments that the information about the properties of a battery, or other selected objects, can be determined without a hard wire connection, or a line of sight, between the sensors and the receiving unit. Moreover, passive transducers, such as magnetostrictive elements, and sensors, such as thermistors and voltage divider circuits, do not require a power source, such as a battery, to operate. This provides advantages over sensor circuits that are configured with active elements and require a power source, such as a battery, to operate.

While the best mode for carrying out the invention has been described in detail, those familiar with the art to which this invention relates will recognize various alternative designs and embodiments for practicing the invention as defined by the following claims.

What is claimed:

1. A sensor arrangement for determining a value of at least one property of a selected object, the sensor arrangement comprising:
    a magnetostrictive element configured to output magnetic signals in response to an alternating magnetic field;
    a first sensor configured to sense a value of a property of the selected object and to provide an electrical resistance that varies in response to variations in the sensed value, the first sensor cooperating with the magnetostrictive element to vary the frequency of the signals output by the magnetostrictive element based on variations of the electrical resistance provided by the first sensor;
    a transmitter configured to generate and send an alternating magnetic field to the magnetostrictive element; and
    a receiver for receiving the signals output by the magnetostrictive element.

2. The sensor arrangement of claim 1, further comprising a control module having the transmitter and receiver integrated therein.

3. The sensor arrangement of claim 2, the selected object being a battery in a vehicle, and wherein the control module includes a battery control module, and the first sensor includes a thermistor configured to sense a temperature of the battery.

4. The sensor arrangement of claim 3, the battery including a plurality of battery modules, the sensor arrangement further comprising:
    a plurality of the magnetostrictive elements, each being associated with a respective one of the battery modules and configured to output magnetic signals in response to the magnetic field generated by the control module; and
    a plurality of the first sensors, each of the first sensors being configured to sense the temperature of a respective one of the battery modules and to provide an electrical resistance that varies in response to variations in the sensed temperature, each of the first sensors cooperating with a respective one of the magnetostrictive elements to vary the frequency of the signals output by the respective magnetostrictive element based on variations of the electrical resistance provided by the respective first sensor.

5. The sensor arrangement of claim 4, further comprising a plurality of identification circuits, each of the identification circuits being operable to enable and disable a respective one of the first sensors to inhibit the effect of the first sensors on the signals output by the respective magnetostrictive element, each of the identification circuits cooperating with a respective one of the magnetostrictive elements to provide a different electrical resistance for each respective magnetostrictive element, thereby facilitating identification of each of the magnetostrictive elements.

6. The sensor arrangement of claim 5, further comprising a plurality of second sensors, each being configured to sense a value of a second property of a respective one of the battery modules, and to provide an electrical resistance based on the value it senses, each of the second sensors cooperating with a respective one of the magnetostrictive elements such that the frequency of the signals output by the respective magnetostrictive elements is affected by the electrical resistance provided by the respective second sensor.

7. The sensor arrangement of claim 6, wherein each of the identification circuits is further operable to enable and disable a respective one of the second sensors to inhibit the effect of the second sensors on the output signals of the respective magnetostrictive element, thereby allowing independent determination of the effect of a respective first sensor and the effect of a respective second sensor on the signals output by a respective one of the magnetostrictive elements.

8. The sensor arrangement of claim 7, wherein each of the second sensors includes a voltage sensor.

9. The sensor arrangement of claim 8, wherein each of the identification circuits is configured to disable respective first and second sensors when the vehicle is in a key-on condition, thereby allowing each of the battery modules to be identified, and thereafter, while the vehicle is operating, each of the identification circuits is configured to alternately: enable a respective first sensor and disable a respective second sensor, and enable a respective second sensor and disable a respective first sensor, thereby allowing independent determination of the temperature and voltage of each of the battery modules.

10. A sensor arrangement for determining a value of at least one property of a selected object, the sensor arrangement comprising:
a passive transducer configured to output mechanical oscillations at a frequency in response to a magnetic field, the mechanical oscillations generating corresponding magnetic output signals;
a first sensor configured to sense a value of a first property of the selected object and to provide an electrical resistance based on the sensed value, the first sensor cooperating with the transducer such that the frequency of the output signals generated by the transducer is at least in part dictated by the electrical resistance provided by the first sensor;
a transmitter for generating and sending a magnetic field to the transducer; and
a receiver for receiving the output signals generated by the transducer.

11. The sensor arrangement of claim 10, wherein the transmitter includes an antenna disposed proximate the selected object and configured to output the magnetic field to the selected object.

12. The sensor arrangement of claim 11, further comprising a control module having the transmitter and the receiver integrated therein.

13. The sensor arrangement of claim 12, wherein the antenna is further configured to receive the output signals generated by the transducer, thereby providing a single source for sending and receiving signals to and from the transducer.

14. The sensor arrangement of claim 13, wherein the transmitter generates and sends the magnetic field in pulses.

15. The sensor arrangement of claim 14, further comprising a second sensor configured to sense a value of a second property of the selected object and to provide an electrical resistance based on the value it senses, the second sensor cooperating with the transducer such that the frequency of the output signals generated by the transducer is affected by the electrical resistance provided by the second sensor.

16. A method for determining a value of at least one property of at least one selected object using a sensor arrangement including a passive transducer and a first sensor, the transducer being configured to output mechanical oscillations at a frequency in response to a magnetic field, the mechanical oscillations generating corresponding magnetic output signals, the first sensor being configured to sense a value of a first property of the selected object and to provide an electrical resistance based on the sensed value, the first sensor cooperating with the transducer such that the frequency of the output signals generated by the transducer is at least in part dictated by the electrical resistance provided by the first sensor, the sensor arrangement further including a second sensor configured to sense a value of a second property of the selected object and to provide an electrical resistance based on the value it senses, the second sensor cooperating with the transducer such that the frequency of the output signals generated by the transducer is affected by the electrical resistance provided by the second sensor, the method comprising:
disabling operation of one of the sensors;
enabling operation of the other sensor, thereby allowing determination of the value sensed by the enabled sensor independently from the disabled sensor;
sensing a value of a property of the selected object with the enabled sensor;
sending a magnetic field to the transducer;
receiving the output signals generated by the transducer; and
determining the sensed value of the property of the selected object using the output signals received, including correlating the frequency of the output signals received with the resistance of the enabled sensor, and correlating the resistance of the enabled sensor with the sensed value.

17. The method of claim 16, the sensor arrangement further including a plurality of the passive transducers, and a plurality of the first and second sensors, each of the transducers being associated with: a different selected object, one of the first sensors, and one of the second sensors, the sensor arrangement further including a plurality of identification circuits, each of the identification circuits cooperating with a respective one of the transducers to provide a different electrical resistance for each respective transducer, thereby facilitating identification of each of the transducers, the method further comprising:
disabling all of the first and second sensors;
sending a magnetic field to the transducers;
receiving the output signals generated by the transducers; and
determining an identification for each of the transducers using the output signals received, including correlating the frequencies of the output signals received with the resistance of a respective identification circuit.

18. The method of claim 17, further comprising:
enabling each of the first sensors and disabling each of the second sensors;
sending a magnetic field to the transducers;
receiving the output signals generated by the transducers;
determining the sensed values of the first property of each of the selected objects using the output signals received, including correlating the frequency of the output signals received with the resistances of the first sensors, and correlating the resistances of the first sensors with the sensed values;
enabling each of the second sensors and disabling each of the first sensors;
sending a magnetic field to the transducers;
receiving the output signals generated by the transducers; and
determining the sensed values of the second property of each of the selected objects using the output signals received, including correlating the frequency of the output signals received with the resistances of the second sensors, and correlating the resistances of the second sensors with the sensed values.

* * * * *

UNITED STATES PATENT AND TRADEMARK OFFICE
CERTIFICATE OF CORRECTION

PATENT NO. : 7,651,267 B2  Page 1 of 1
APPLICATION NO. : 11/463057
DATED : January 26, 2010
INVENTOR(S) : Gonzales et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this

Twenty-eighth Day of December, 2010

David J. Kappos
*Director of the United States Patent and Trademark Office*